(12) United States Patent
Choquette

(10) Patent No.: US 11,277,198 B2
(45) Date of Patent: Mar. 15, 2022

(54) MONITORING OPERATIONAL STATUS AND DETECTING FAULTS IN A HIGH THROUGHPUT SATELLITE SYSTEM

(71) Applicant: Hughes Network Systems, LLC, Germantown, MD (US)

(72) Inventor: George Joseph Choquette, Potomac, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 0 days.

(21) Appl. No.: 16/866,286

(22) Filed: May 4, 2020

(65) Prior Publication Data

US 2021/0344411 A1    Nov. 4, 2021

(51) Int. Cl.
*H04B 7/185* (2006.01)
*H04B 7/06* (2006.01)
*G06F 16/9035* (2019.01)
*G06F 16/9038* (2019.01)

(52) U.S. Cl.
CPC ..... *H04B 7/18513* (2013.01); *G06F 16/9035* (2019.01); *G06F 16/9038* (2019.01); *H04B 7/0617* (2013.01)

(58) Field of Classification Search
CPC .............. H04B 7/18513; H04B 7/0617; G06F 16/9038; G06F 16/9035
See application file for complete search history.

(56) References Cited

U.S. PATENT DOCUMENTS

| | | | |
|---|---|---|---|
| 9,116,767 B1* | 8/2015 | Arif | H04L 43/08 |
| 9,251,494 B2* | 2/2016 | Gventer | G06Q 10/0875 |
| 10,359,745 B2* | 7/2019 | Meruva | F24F 11/30 |
| 10,853,232 B2* | 12/2020 | Henry | G06F 11/3692 |
| 11,023,367 B1* | 6/2021 | Dunn | G06F 16/24575 |
| 2003/0060996 A1* | 3/2003 | Yi | G06F 11/24 702/121 |
| 2005/0260982 A1* | 11/2005 | Ko | H04L 41/00 455/423 |
| 2009/0049337 A1* | 2/2009 | Hsieh | G06F 11/2015 714/14 |
| 2009/0231438 A1* | 9/2009 | Srivastava | H04N 17/004 348/180 |

(Continued)

*Primary Examiner* — Dominic E Rego
(74) *Attorney, Agent, or Firm* — Mannava & Kang, P.C.; George Y. Wang

(57) ABSTRACT

A system for monitoring operational status and detecting faults in a satellite system is disclosed. The system may include a processor and a memory storing instructions, which when executed by the processor, cause the processor to select, from a plurality of terminals, a subset of terminals to perform system operation tests. The processor may select the subset of terminals using at least one of a semi-static pre-qualification technique and a dynamic pre-qualification technique. The processor may also perform system operation tests using the selected subset of terminals. The processor may further report results from the system operation test using the selected subset of terminals. In some examples, the processor may also determine potential system operation issues based on the results of the system operation tests, generate an alarm or notification based on the determination of potential system operation issues, and/or abort testing or delay testing to a future testing cycle.

17 Claims, 7 Drawing Sheets

(56) References Cited

U.S. PATENT DOCUMENTS

| | | | |
|---|---|---|---|
| 2010/0176962 A1* | 7/2010 | Yossef | G01R 31/68 340/815.45 |
| 2013/0018501 A1* | 1/2013 | Okuno | H01L 21/67253 700/112 |
| 2013/0166244 A1* | 6/2013 | Turgeon | H01M 10/44 702/117 |
| 2014/0269342 A1* | 9/2014 | Baron | H04L 41/0645 370/242 |
| 2015/0163124 A1* | 6/2015 | Girmonsky | H04L 41/142 709/224 |
| 2016/0077944 A1* | 3/2016 | Kodama | G06F 11/263 714/33 |
| 2017/0026080 A1* | 1/2017 | Jung | H04L 12/2801 |
| 2017/0060713 A1* | 3/2017 | Wang | G06F 16/2455 |
| 2017/0366421 A1* | 12/2017 | Dam | H04L 43/06 |
| 2018/0365135 A1* | 12/2018 | Lake | G06F 11/302 |
| 2018/0373210 A1* | 12/2018 | Soroka | H04J 3/0638 |
| 2019/0097908 A1* | 3/2019 | Mirsky | H04L 43/12 |
| 2019/0165991 A1* | 5/2019 | Cheng | H04L 41/0631 |
| 2020/0097350 A1* | 3/2020 | Pitchaimani | G06F 11/2273 |
| 2020/0249936 A1* | 8/2020 | Barfield, Jr. | G06F 8/433 |
| 2020/0322826 A1* | 10/2020 | Wangler | H04L 43/50 |

\* cited by examiner

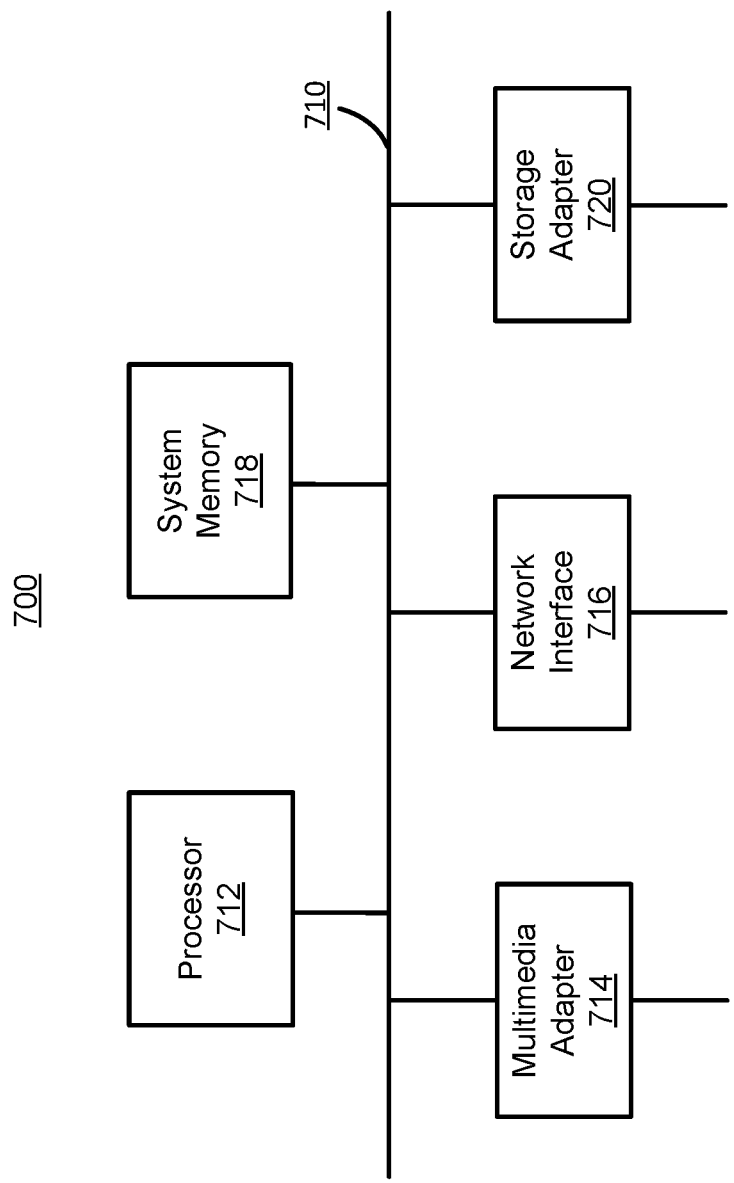

MONITORING OPERATIONAL STATUS AND DETECTING FAULTS IN A HIGH THROUGHPUT SATELLITE SYSTEM

TECHNICAL FIELD

This patent application is directed to satellite communication systems, and more specifically, to systems and methods for monitoring operational status and detecting faults in high throughput satellite (HTS) systems.

BACKGROUND

Advances in telecommunications technologies are increasing availability of voice and data services to consumers. These technological developments are enabling all types of consumers to transmit and receive increasingly larger amounts of multimedia digital content, such texts, streaming audio or video, social media or web content, digital entertainment, interactive gaming, or other digital content.

Satellite communication systems may be used to provision voice and data services. In order to serve more customers and provide higher quality service to these customers, high throughput satellite (HTS) systems may be deployed. High throughput satellite (HTS) systems may support an increase in numbers of spot beams to cater to growing consumer demand. In order to support the increase in the number of spot beams, a corresponding increase in the number of backend system components may be required. Managing a higher volume of backend system components, however, may be more challenging, especially when it comes to tending to potentially more malfunctions or defects in these components. For example, these defects, deficiencies, or issues may include silent faults or silent service degradations, which may occur across several components of the high throughput satellite (HTS) system. Consequently, these faults or degradations, when left unattended, may adversely affect the health or normal operations of satellite communication systems. Although some satellite system operators may use specialized detection tools to monitor and/or debug these and other related issues, such specialized tools tend to further exacerbate the problems as they may increase the complexities in the operation and use of these satellite communication systems.

BRIEF DESCRIPTION OF DRAWINGS

Features of the present disclosure are illustrated by way of example and not limited in the following Figure(s), in which like numerals indicate like elements, in which:

FIG. 7 illustrates a block diagram of a computer system for monitoring operational status and detecting faults, according to an example.

DETAILED DESCRIPTION

Figure 1:
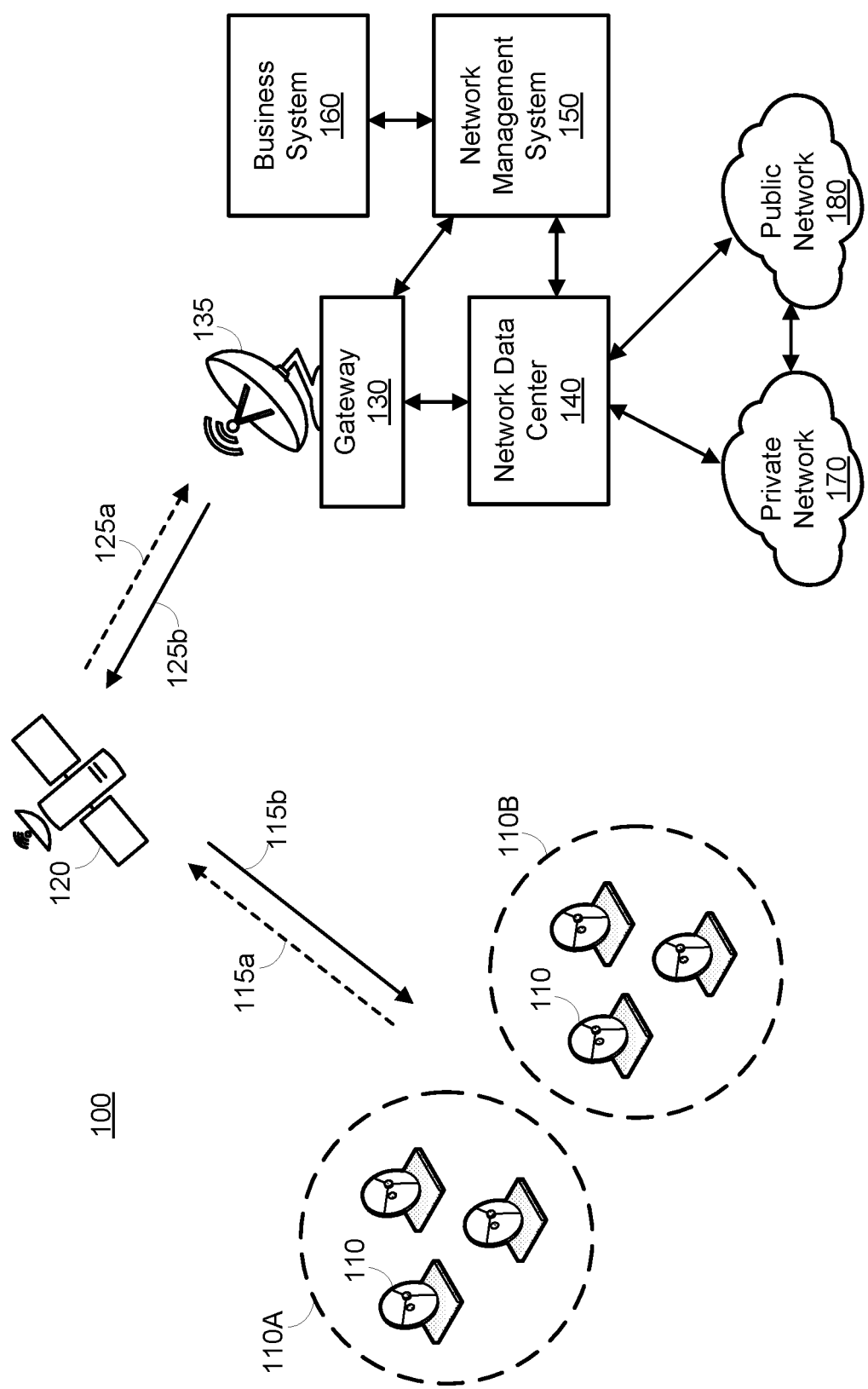
FIG. 1 illustrates a system for monitoring operational status and detecting faults, according to an example.

For simplicity and illustrative purposes, the present disclosure is described by referring mainly to examples and embodiments thereof. In the following description, numerous specific details are set forth in order to provide a thorough understanding of the present disclosure. It will be readily apparent, however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

As described above, high throughput satellite (HTS) systems with larger numbers of spot beams may be used to provision higher quality and more reliable voice and data services to a variety of customers. However, in order to support the larger number of spot beams, these high throughput satellite (HTS) systems may require an increase in the number of components, such as antennas, gateways, data stores, etc. This increase in components may generally correspond with a rise in system complexity and may therefore lead to a greater probability of malfunction or defects, such as silent faults or silent service degradations. The added complexities may therefore give rise to more challenges in managing or troubleshooting all the issues associated with the various components of such high throughput satellite (HTS) systems. Specialized detection tools used by satellite system operators to monitor and/or debug these and other related issues seem to only add more layers to an already-complicated process to monitor operations and health of satellite communication systems.

To address these issues, some satellite communication systems may employ one or more health monitor terminals in each spot beam. These health monitor terminals may include health monitor very small aperture terminals (VSATs) or HM-VSATs. In this scenario, a health monitor VSAT may be deployed in the spot beam to be monitored amongst and in addition to the customer terminal population (e.g., customer VSATs).

However, employing a dedicated health monitor VSAT in each spot beam may highly expensive, and therefore cost prohibitive for many service providers. For instance, the cost for using health monitor VSATs becomes increasingly more expensive as the number of spot beams grows. Furthermore, these health monitor VSATs may only verify operations of the components or paths they use, which in turn may require extensive manual control to be exercised at all the different services and service paths available in the satellite communication system. Consequently, satellite system operators may use these health monitor VSATs to monitor system health only after suspecting any system performance problem. Additionally, deploying these types of in-beam health monitoring VSATs may be impractical for some network configurations. For example, these may include systems with satellite user beams over water for maritime service or other similar configuration where health monitor VSATs may not be easily deployed.

Another approach for monitoring system health of high throughput satellite systems may be to place a health monitor VSAT within or attached to a gateway radio frequency transmission (RFT) rack, which can be controlled to exercise different paths. It should be appreciated that this solution may be typically achieved with suitable frequency and/or level conversion and usually without a very small aperture terminal (VSAT) antenna. Although these gateway-resident HM-VSATs may be deployed with relatively lesser cost compared to dedicated in-beam HM-VSAT installations described above, a technical issue exhibited by this approach is that these gateway-resident terminals may not provide as full or robust system health reading or report. For example, gateway-resident HM-VSATs typically bypass satellite, local spot beam affects, and transmission channel health, thus the system operation tests performed may be insufficient in some cases. Furthermore, gateway-resident HM-VSATs may communicate without satellite delay, and may therefore require manual control to test system health when a problem is suspected. As a result, anticipating the problem is not only impractical but may only get worse, especially with more spot beams in high throughput satellite systems.

Accordingly, systems and methods for monitoring operational status and detecting faults in high throughput satellite (HTS) systems may be needed. Satellite communications systems may benefit from solutions or approaches that are capable of scaling with less cost, as well as those that are more efficient and proactive in monitoring operation status and detecting faults, such as silent faults or other system health problems. As described herein, these faults or degradations, when left unattended, may adversely affect the health of satellite communications systems, placing a premium on satellite communication systems that can accurately, reliably, and efficiently monitor and detect them.

The systems and methods described herein, however, may opportunistically use customer VSATs, rather than dedicated HM-VSATs or gateway-resident HM-VATs, to periodically test high throughput satellite (HTS) system health, for example, in order to better detect silent faults and degradations. In addition, the systems and methods described herein may provide more proactive test coverage and notification mechanisms, all that while maintaining lower expense and operating cost. In the examples described herein, a process or technique may be employed to determine which customer terminal may be "pre-qualified" for performing system operation or health tests in each beam. In some examples, pre-qualification may be based on terminal capability, permission, priority, current operating status, and/or other pre-qualification factors. It should be appreciated that only those terminals that are pre-qualified based on these factors may be identified and used to perform any number of system operation or health tests for any given test cycle.

Additionally, the systems and methods described herein may enable a test suite, or package of system operation or health tests, to be adaptive. In other words, the tests that are to be performed by the pre-qualified customer terminals may or may not significantly increase network loading during times of congestion. By identifying the customer terminals that are capable and available, for example, performing system operation tests using these customer terminals may not may not contribute to fair access policy (FAP) calculation of selected user terminals. In this way, the systems and methods for monitoring operational status and detecting faults in high throughput satellite (HTS) systems, as described herein may provide solutions that are more proactive, cost efficient, scalable, and amenable to broader satellite and test coverage. These and other benefits and advantages may be apparent in the examples outlined below.

FIG. 1 illustrates a system 100 for monitoring operational status and detecting faults, according to an example. In some examples, the system 100 may depict a satellite communication system capable of providing at least voice and/or data services. In some examples, the satellite communication may be a high throughput satellite (HTS) system. The system 100 may include any number of terminals 110, a satellite 120, a gateway 130, a network data center 140, a network management system (NMS) 150, a business system 160, or other various system elements or components. The system 100 may also include a private network 170 and/or public network 180. It should be appreciated that the system 100 depicted in FIG. 1 may be an example. Thus, the system 100 may or may not include additional features and some of the features described herein may be removed and/or modified without departing from the scopes of the system 100 outlined herein.

The terminals 110 may be any variety of terminals. For example, the terminals 110 may be customer terminals, such as very small aperture terminals (VSATs). It should be appreciated that VSATs may be terminals that are mounted on a structure, habitat, or other object or location. Depending on application, the terminals 110 may include or incorporate any number of antenna dishes, which may be provided in various sizes, depths, or dimensions (e.g., small, medium, large, etc.). Although the terminals 110 may typically remain in the same location once mounted, the terminals 110 may be removed from their mounts, relocated to another location, and/or may be configured to be mobile terminals. For instance, the terminals 110 may be mounted on mobile platforms that facilitate transportation thereof from one location to another. Such mobile platforms may include, for example, any number of mobile vehicles, such as cars, buses, boats, planes, etc. It should be appreciated that such terminals 110 may generally be operational when still and not while being transported. That said, there may be scenarios where the terminals 110 may be transportable (mobile) terminals that remain operational during transit. As used herein, the terms "terminal," "customer terminal," "satellite terminal," and/or "VSAT" may be used interchangeably to refer to these terminal types.

It should be appreciated that any number of customer premise equipment (CPE) (not shown) may be communicatively coupled to the terminals 110. In some examples, the customer premise equipment (CPE) may include any number of computing or mobile devices. For example, such a computing or mobile device may include a laptop, a tablet, a mobile phone, an appliance, a camera, a sensor, a thermostat, a vehicle, a display, etc. In general, the customer premise equipment (CPE) may include, without limitation, any number of network-enabled computing devices, elements, or systems. It should be appreciated that a network of such devices may be commonly referred to as the "Internet of Things" (IoT).

As shown in FIG. 1, there may be a plurality of groups of terminals 110 (e.g., customer VSATs). For example, there may be a first group 110A of terminals 110 and a second group 110B of terminals 110. In some examples, the first group 110A may be "pre-qualified" terminals. The second group 110B may be "disqualified" terminals. The process and mechanism in selecting, pre-qualifying, and/or disqualifying the terminals 110 will be described in greater detail below. That said, it should be noted that categorizing the terminals 110 into at least a first group 110A and a second group 110B may be an important aspect of monitoring system health. In some examples, the systems and methods described herein may recognize that there are terminals 110 (e.g., VSATs with health monitoring capabilities) that are deployed and not actively in use by customers. By identifying and leveraging these particular terminals 110, the systems and methods described herein may better "load balance" existing terminals 110 for monitoring system health, taking action to avoid depleting customer volume allowance, and without making use of purpose-attached or customer owned end-user devices to control test scenarios, as described below. These and other benefits will be apparent in the examples presented below.

The satellite 120 may be an object intentionally placed into orbit. In some examples, the satellite 120 may be an artificial satellite that is configured to transmit and receive data signals. For example, the satellite 120 may form one or more beams and provide connectivity between at least the terminals 110 and the gateway 130. More specifically, the satellite 120 may communicate data signals using these beams with the terminals 110 via a terminal return channel 115a and a terminal forward channel 115b, and with the gateway 130 via a gateway return channel 125a and a gateway forward channel 125b. It should be appreciated that the satellite 120 may form any number of beams to communicate data signals with any number of components, even beyond the terminals 110 or the gateway 130 as shown.

In some examples, the satellite 120 may be a communication satellite, such as a high-throughput satellite, which may include any satellite that is capable of providing at least twice (e.g., 20+ times, 100+ times, etc.) the total amount of throughput as a classic fixed-satellite service (FSS) satellite. In some examples, the satellite 120 may include, but not limited to, a transponded satellite, a regenerative satellite, and/or other similar satellite that may generate one or more spot beams. Furthermore, in some examples, the satellite 120 may operate in geosynchronous, mid-earth, low-earth, elliptical, or some other orbital configuration.

The gateway 130 may include or be communicatively coupled to a transceiver 135, such as a radio frequency transceiver (RFT). The transceiver 135 may include an antenna unit of any type (e.g., transmitter, receiver, communication element, etc.), which may transmit and receive signals. In some examples, the transceiver 135 may be useable, by the gateway 130 of system 100, to transmit and receive data from the terminals 110, via communications from the satellite 120, and may be configured to route data and traffic from these terminals 110 to any other element or component in the system 100, such as the network data center 140 and/or network management system (NMS) 150. The gateway 130 may be further configured to route traffic to and from the public internet 180 and/or private network 170 across the satellite communication channels 115a, 115b, 125a, or 125b to any terminal 110, which would then provide data communications or route traffic to any customer premise equipment (CPE) (not shown) associated with the terminal 110. Although depicted as a single element, the gateway 130 may include a single gateway, multiple gateways residing locally or remotely, in full or in part, relative to the other system components. As described in more detail below, the gateway 130, the network data center 140, and/or the network management system (NMS) 150 may provide operations associated with system health monitoring and fault detection.

Figure 2:
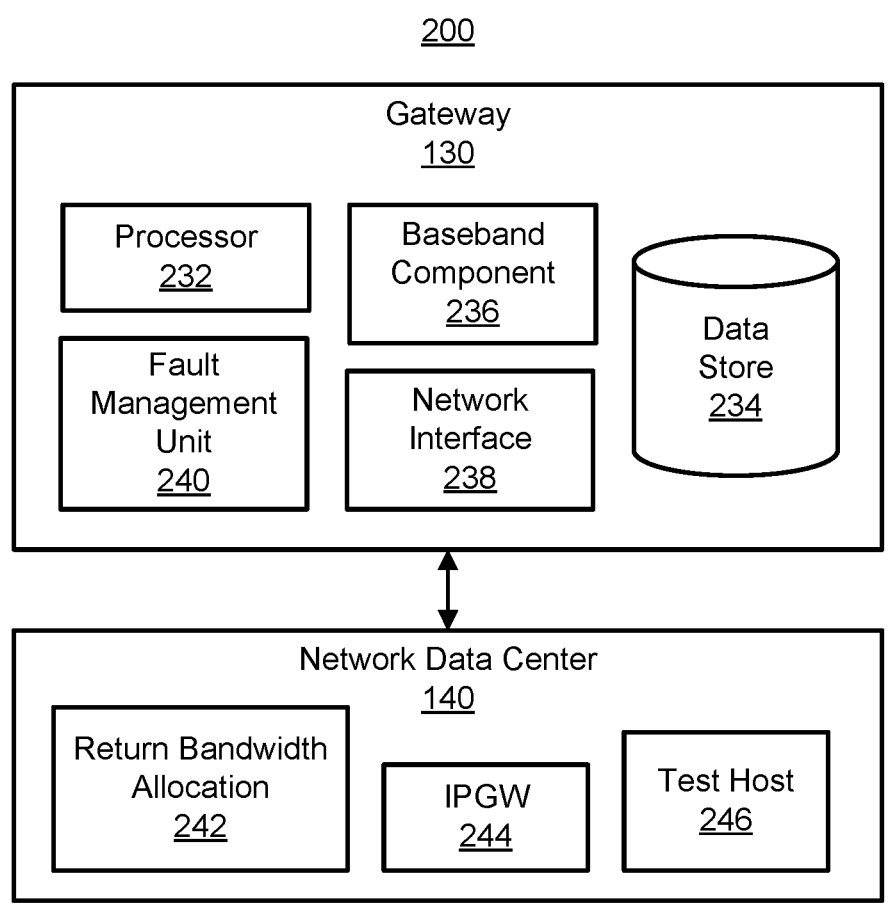
FIG. 2 illustrates a system element for monitoring operational status and detecting faults in a satellite system, according to an example.

For example, FIG. 2 illustrates a system component 200 for monitoring operational status and detecting faults, according to an example. As shown, the system component 200 may include the gateway 130 and the network data center 140. Here, the system component 200 may include various components, implemented in hardware, software, or a combination thereof, to facilitate communication between the terminals 110, system components, private network 170, and public network 180 via the satellite 120. In some examples, the gateway 130 may include a processor 232 (e.g., a computer processing unit (CPU), etc.), a data store 234. While generically illustrated, the processor 232 may include also various configurations including, without limitations, a personal computer, laptop, server, etc. The data store 234 may be used, for example, to store and provide access to information pertaining to various operations of and in the system 100. Although depicted as a single element, the processor 232 and/or the data store 234 may be configured as a single element, multiple elements, or an array of elements. For example, the gateway 130 may include any number of processors and/or data stores in order to accommodate the needs of a particular system implementation. Various examples may further provide for redundant paths for components of the gateway 130. These redundant paths may be associated with backup components capable of being seamlessly or quickly switched in the event of a failure or critical fault of any primary component.

The gateway 130 may also include other components, such as a baseband component 236, a network interface 238 and a fault management unit 240. In some examples, the baseband component 236 may process signals being transmitted to, or received from, the satellite 120. For example, the baseband component 236 may further include any number of modulator/demodulator units, system timing equipment, switching devices, etc. The modulator/demodulator units, for example, may be used to generate carriers that are transmitted into each spot beam and to process signals received from the terminals 110. The system timing equipment may be used to distribute timing information for synchronizing transmissions from the terminals 110. Other various components or units may also be provided.

The network interface 238 may provide the gateway 130 with an ability to communicate with a variety of devices over a network and may include, for example, an Ethernet adapter, a Fibre Channel adapter, and/or other wired- or wireless-enabled adapter. For example, the network interface 238 may allow the gateway 130 to communicate with various network elements. Although this may be achieved generally via the network data center 140, it should be appreciated that each of the gateway 130 and/or the network data center 140 may also be integrated into a single facility, which at times may also be referred to as a "gateway." In some examples, the network interface 238 may include at least one edge router for establishing connections with a terrestrial connection point from a service provider. Depending on the specific implementation, however, multiple terrestrial connection points may be utilized. The network interface 238 may therefore provide a direct or indirect connection from one network element to another, and facilitate communication and between various network elements.

The fault management unit 240 may help monitor activities and output one or more alerts in the event of a malfunction in any of the gateway components. In some examples, the fault management unit 240 may include, for example, one or more sensors and interfaces that connect to different components of the gateway 130 or other system component. The fault management unit 240 may also be configured to output alerts based on instructions received, locally or remotely, from the network data center 140 and/or network management system (NMS) 150.

The network data center 140 may be communicatively coupled to the gateway 130, as well as other system components, such as the network management system (NMS) 150, private network 170, and/or public network 180. In some examples, the network data center 140 may be a satellite network data center that is configured to perform protocol processing and bandwidth allocation for gateway traffic and/or VSAT communications in the served beams. For instance, as shown in FIG. 2, the network data center 140 may include a return bandwidth allocation unit 242, an internet protocol gateway (IPGW) 244, and a test host 246. The return bandwidth allocation unit 242 may allow the network data center 140 and/or the gateway 130 to allocate return channel access to VSATs in response to bandwidth requests. The internet protocol gateway (IPGW) 244 help facilitate a traffic processing function, which may allow forwarding and protocol processing between external public networks and private networks (e.g., private network 170 and/or public network 180), and gateway communication channels. The test host 246 may help support certain health monitor test functions. In some examples, the test host 246 may function with the fault management unit 240 of the gateway 130 to monitor system health and detect faults, as described herein. Although depicted in FIG. 1 and FIG. 2 as a separate and distinct element, the network data center 140, in some examples, may be collocated and/or integrated, fully or partially, with the gateway 130, or may be positioned at some other location. Furthermore, although shown as a single element, the network data center 140, in some examples, may be include a plurality of network data centers that are local or remote, in full or in part, relative to the other system components.

The network data center 140 and the gateway 130 may include many other functions not directly referenced in this description and therefore omitted for clarity. For instance, it should be appreciated that the processor 232 and/or the data store 234, in some scenarios, may also be configured as part of the network data center 140 with the IPGW 244 or the test host 246. Additionally, given architectures might place certain functions, such as return bandwidth allocation unit 242 within the gateway 130 rather than within the network data center 140, and might place certain functions or elements, such as modems, within the network data center 140 rather than within the gateway 130. Such differences are not material to the design disclosed here. Furthermore, even though system component 200 is described primarily with respect to the gateway 130 and the network data center 140, it should be appreciated that the system component 200 of FIG. 2 may also be directed to the network management system (NMS) 150, the business system 160, and/or any other system element. As mentioned above, there may implementations where the system 100 and/or system component 200 may utilize any combination of multiple gateways, network data centers, network management systems, etc. to perform the system health monitoring features as described herein.

Referring back to FIG. 1, the network management system (NMS) 150, maintains, in full or in part, various information (configuration, processing, management, etc.) for the gateway 130, and terminals 110 and beams supported by the gateway 130. It should be appreciated that the network management system (NMS) 150 may or may not be co-located within the same physical structure as the gateway 130. Furthermore, the network management system (NMS) 150 may be single or a plurality distributed components that may be communicatively coupled to each other and/or with other system elements, such as the gateway 130 (e.g., using the previously described hardware and external networks). The network management system (NMS) 150 may, among other things, include a configuration manager or other similar management unit. The network management system (NMS) 150 may also include any number of reporting systems. As will be discussed in greater detail below, each of these multiple reporting systems may be configured to receive different information (e.g., reports) from the terminals 110. External reporting systems may also be configured to receive information (e.g., reports) from the terminals 110 by establishing a communication link with network management system (NMS) 150.

The business system 160, or other various system elements or components, may also be communicatively coupled to the network management system (NMS) 150 and/or gateway 130. In some examples, the business system 160 may include a virtual network operator (VNO), which may be configured to communicate with the gateway 130 and/or the network management system (NMS) 150 in order to monitor the status of its own terminals 110. More particularly, a virtual network operator (VNO), in some scenarios, may be a business or government entity, that may have access (by purchase or license) to a managed service and associated capacity from a satellite network operator in order to provide communication connectivity and/or communication for a privately-owned set of terminals 110. The virtual network operator (VNO) may therefore manage various aspects of such terminals 110 via the gateway 130 and/or the network management system (NMS) 150.

The private network 170 and/or public network 180 may include any variety of networks. For example, the private network 170 may be a local area network (LAN), and the public network 180 may be a wide area network (WAN). That said, the private network 170 and/or public network 180 may each also be a local area network (LAN), wide area network (WAN), the Internet, a cellular network, a cable network, a satellite network, or other network that facilitates communication between the components of system 100 as well as any external element or system connected to the private network 170 and/or public network 180. The private network 170 and/or public network 180 may further include one, or any number, of the exemplary types of networks mentioned above operating as a stand-alone network or in cooperation with each other. For example, the private network 170 and/or public network 180 may utilize one or more protocols of one or more clients or servers to which they are communicatively coupled. The private network 170 and/or public network 180 may facilitate transmission of data according to a transmission protocol of any of the devices and/or systems in the private network 170 and/or public network 180. Although each of the private network 170 and/or public network 180 is depicted as a single network in FIG. 1, it should be appreciated that in some examples, each of the private network 170 and/or public network 180 may include a plurality of interconnected networks as well.

While the processors, components, elements, systems, subsystems, and/or other computing devices may be shown as single components or elements, one of ordinary skill in the art would recognize that these single components or elements may represent multiple components or elements, and that these components or elements may be connected via one or more networks. Also, middleware (not shown) may be included with any of the elements or components described herein. The middleware may include software hosted by one or more servers. Furthermore, it should be appreciated that some of the middleware or servers may or may not be needed to achieve functionality. Other types of servers, middleware, systems, platforms, and applications not shown may also be provided at the front-end or back-end to facilitate the features and functionalities of the system 100, system component 200, and their components, as shown in FIGS. 1 and 2.

The systems and methods described herein may provide a health monitoring system that makes use of deployed and pre-qualified customer terminals to conduct system health checks and report results. As shown in FIG. 1, a population of customer terminals 110 deployed in a user beam may include a first group 110A of "pre-qualified" terminals 110. The terminals 110 of the first group 110A may be used to conduct health monitoring tests, as described below, and the second group 110B, which may be designated as "disqualified" terminals 110, may not be used for this purpose. In this way, those pre-qualified terminals 110 of the first group 110A, when not actively in use by customers, for example, may be used to perform any number of system operation or health tests without contributing to overall usage that depletes a customer volume allowance, and without making use of purpose-attached or customer owned end-user devices to stimulate or control test scenarios, such as designated HM-VSATs or gateway-resident VSATs.

By identifying capable and available customer terminals 110 that are already deployed using various pre-qualification techniques, and leveraging these terminals 110 to perform one or more system operation tests, the systems and methods described herein may not require purpose-installed health monitor VSAT sites or similar dedicated equipment, minimizing capital and operational expense. Furthermore, the approaches described herein may not depend on end-user cooperation or devices (such as phones or desktop computers). Additionally, the systems and methods described herein provides an approach that may be fully scalable using existing equipment, and without interfering with user traffic performance. Also, the systems and methods outlined herein may recognize different capabilities of different terminals to support different types of system operation test to provide higher levels of flexibility, adaptability, and customizability.

Figure 3:
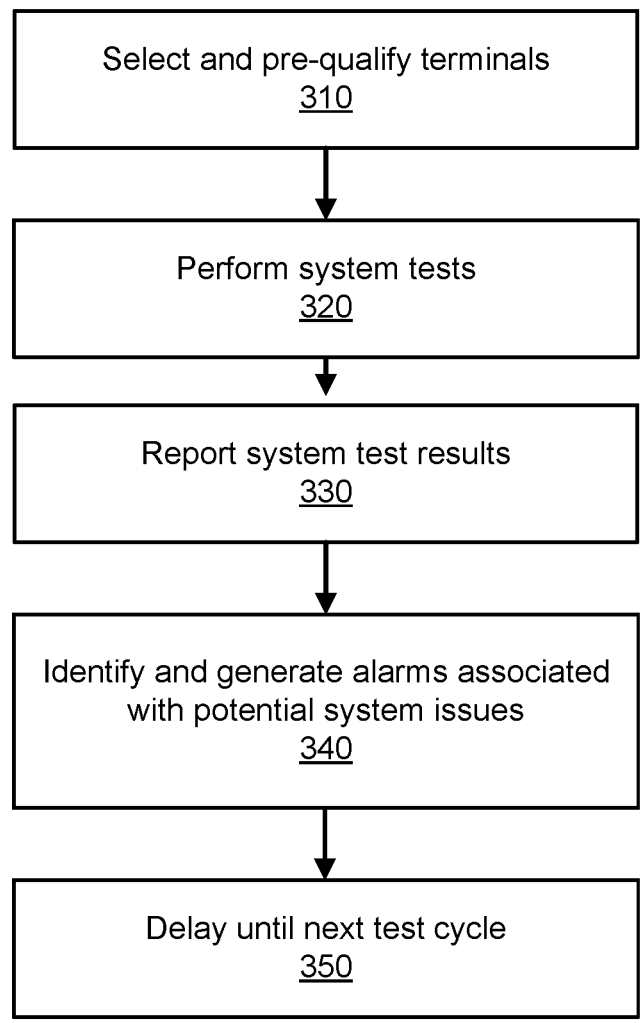
FIG. 3 illustrates a method for monitoring operational status and detecting faults in a satellite a system, according to an example.

FIG. 3 illustrates a method 300 for monitoring operational status and detecting faults in a satellite a system, according to an example. The method 300 is provided by way of example, as there may be a variety of ways to carry out the method described herein. Although the method 300 is primarily described as being performed by the system 100 of FIG. 1 and/or the system component 200 of FIG. 2, the method 300 may be executed or otherwise performed by one or more processing components of another system or a combination of systems. Each block shown in FIG. 3 may further represent one or more processes, methods, or sub-routines, and one or more of the blocks may include machine readable instructions stored on a non-transitory computer readable medium and executed by a processor or other type of processing circuit to perform one or more operations described herein. The system 100 or system component 200, for example, may perform a health monitoring process on a predetermined regular interval during normal system operations. In some examples, this may be an automated sequence of actions, as described below and shown in FIG. 3.

At 310, the terminals 110 may be selected and placed in either the first group 110A of "pre-qualified" terminals 110 or the second group 110B of "disqualified" terminals 110. For example, the network management system (NMS) 150 may select, from a plurality of customer terminals 110, a subset of customer terminals 110 to perform system operation tests using at least one of a semi-static pre-qualification technique or a dynamic pre-qualification technique, described in more detail below. At 320, one or more system operation tests (or health monitoring tests) may be performed. For example, the network management system (NMS) 150 may perform these system operation tests using the selected subset of customer terminals 110. The types of system operation tests will be described in more detail below. At 330, results from the one or more system operation tests may be generated and/or reported. For example, the network management system (NMS) 150 may coordinate with the gateway 130 and/or network data center 140 to report results from the system operation test performed by the selected subset of customer terminals 110. At 340, alarms associated with potential system problems, based on the results from the one or more system operation tests, may be identified and/or generated. Again, the network management system (NMS) 150 may coordinate with the gateway 130 and/or network data center 140 to identify and/or generate these alarms or notifications. These alarms and/or notifications may be based on problems or issues uncovered by the system operation tests performed by the customer terminals 110. At 350, a delay may be initiated depending the problems identified. In some examples, there may be a delay of performing system operation tests until a next test cycle.

Although the method 300 may be continuous or automatic, it should be appreciated that the method 300 may be suspended at any time, based on operator command or automatically by the NMS during certain extraordinary operations, such as major maintenance or upgrade activity or for other reasons. Details for each of these actions will not be described in greater detail below.

Figure 4:
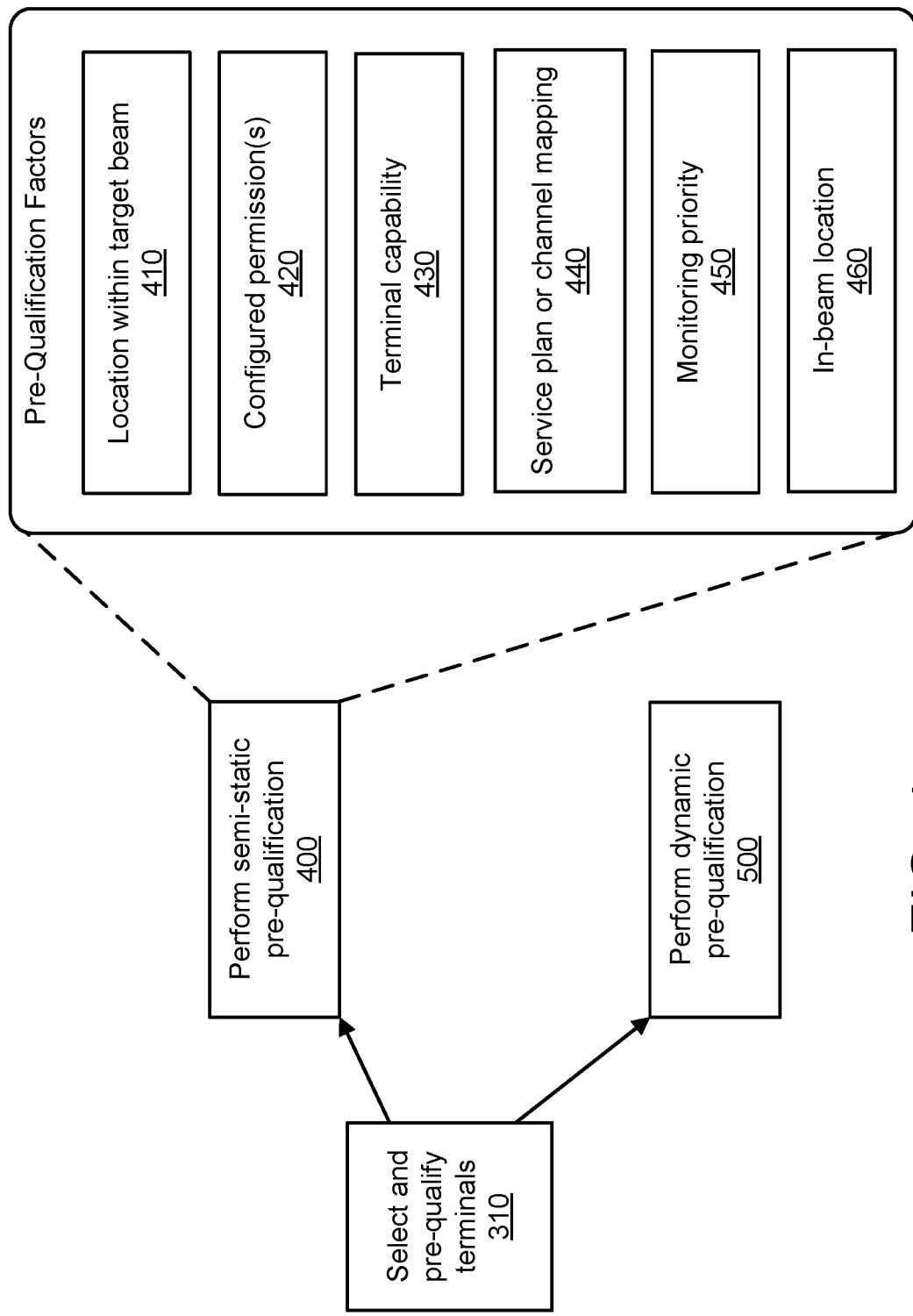
FIG. 4 illustrates a method for selecting and pre-qualifying terminals for monitoring health in a satellite system, according to an example.

FIG. 4 illustrates a process by which system 100 may select and pre-qualify 310 terminals 110, according to an example. As shown, selecting and pre-qualifying 310 terminals 110 may include performing a semi-static pre-qualification technique 400 and/or performing a dynamic pre-qualification technique 500. Again, an appropriate set of terminals 110 may need to be selected and pre-qualified to order to be able to check or monitor the various spot beam communication channels, resources, and/or services of the satellite system. At least part of the selection and pre-qualification 310 may include identifying certain pre-qualification factors exhibited by the terminals 110. For instance, in order to be used for health monitoring, the terminals 110 may need to be in the targeted spot beams, have certain health monitoring capabilities, and/or be available or capable to perform one or more specific system operation tests.

In some examples, the semi-static pre-qualification 400 may be provided as a first action to select and pre-qualify the terminals 110 to identify a set or subset of candidate terminals, from a plurality of customer terminals 110, for health monitoring. It should be appreciated that the semi-static pre-qualification 400 may be performed frequently (e.g., continuously at predetermined short-term intervals) or infrequently (e.g., once a day, once a week, once a month). In some examples, the semi-static pre-qualification 400 may be performed as instructed by a system operator. In most applications and in general, the semi-static pre-qualification 400 may be performed infrequently since terminal capabilities and permissions may be unlikely to change from one test cycle to another test cycle.

For the semi-static pre-qualification 400, it should be appreciated that a system operator may configure a set of deployed terminals to be candidates for use for health monitoring in each satellite beam, through a user interface, spreadsheet list, and/or machine-to-machine interface, in which case this action is trivial and ends. In addition or alternatively, the network management system (NMS) 150 may coordinate or perform a set of pre-qualification actions to determine a set of deployed terminals to be candidates for use for health monitoring in each satellite beam. For example, referring back to FIG. 4, the semi-static pre-qualification 400 may involve the selecting and pre-qualifying terminals 110 based on any one of a variety of pre-qualification factors. These pre-qualification factors may include, but not limited to, whether a terminal is within a target beam, any configured permission(s), terminal capacity, terminal capability, service plan, channel mapping, monitoring priority, in-beam location, and/or any other pre-qualification factor or combination thereof.

In identifying terminals 110 based on beam location, the network management system (NMS) 150, for example, may identify a set of terminals 110 that are deployed and activated within each target satellite user beam. As a result of filtering terminals 110 using this pre-qualification factor (e.g., whether the terminal 110 is within a target beam for performing system operation tests), any terminals 110 that are positioned in other (non-target) beams may be excluded.

In identifying terminals 110 based on configured permission, the network management system (NMS) 150, for example, may identify or select those terminals 110 which may be designated as permitted to be used for health monitoring and thereby exclude those terminals 110 which are not permitted for use. It should be appreciated that such configure permission(s) may be predetermined. For example, such permission may be indicated by a business system 160 during or following a terminal configuration or activation process, or possibly as granted or not granted by an end user or customer. In some situations, it may be the case that a customer contract or some local regulation prohibits use of certain customer VSATs 110 for network monitoring purposes. In some scenarios, it may be the case that the customer is given an opt-in or opt-out capability via a network management or business system portal associated with the network management system (NMS) 150 and/or business system 160, which may be in exchange for some consideration such as a higher download allowance or other similar incentive or bargain—for consideration. In other situations, it may be the case that specific VSAT site factor(s) may need to be considered. For example, there may be a specific VSAT site factor that prohibits using terminals that are solar powered with battery storage. These and other configure permission(s) may be used as part of the terminal pre-qualification.

Terminal capability may be another pre-qualification factor. For example, the network management system (NMS) 150 may select terminals 110 have the capabilities to perform targeted tests and exclude those terminals 110 that are not capable of performing these tests, especially in situations where such differentiation may be applicable. For example, there may be a situation where a newer generation of terminals are deployed or terminals that are running a newer software release has certain capabilities not available in an older generation of terminals or terminals that have yet been updated by that software release. These older terminals or non-updated terminals may lack capabilities to perform specific system tests as part of the process for monitoring system health. It should be appreciated that there may also be scenarios where certain terminals are deployed with certain communication channel capabilities and other terminals are deployed with other communication channel capabilities, where these sets of capabilities may not be fully overlapping, and where both sets may need to be tested. In such situations, for example, it may be important to pre-qualify two or more sets of candidate health monitor VSATs to provide the desired test coverage. Other similar combinations or permutations may also be provided.

Pre-qualification based on service plan or channel mapping may also be provided. In so far as gateway equipment or communication channels are mapped to specific service plans, the network management system (NMS) 150 may partition the candidate terminals 110 into sufficient candidate sub-lists to provide test coverage of all equipment and paths to be checked. A point to consider here may be that in the event that executing tests would cause a change to a user perceived environment, for example, reassignment of a dynamic internet protocol (IP) subnet address, or disconnect of an active transmission control protocol (TCP) connection, then multiple partitions of test VSATs may be selected to avoid or minimize such impact. In other words, such an approach may be system specific, and although such partitioning could potentially introduce more complexity into the pre-qualification process, it should be appreciated that a straightforward hardware/software design activity may be provided.

Monitoring terminal priority may also be another pre-qualification factor for selecting candidate terminals 110. Although the system 100 described herein may provide a way to monitor VSAT health without requiring dedicated, purpose-installed health monitoring terminals, it should be appreciated that in some situations the system operator, for whatever reason, may choose to deploy health monitoring VSATs in certain high-value or low-cost locations (such as at a gateway site). In this scenario, those particular terminals, which may not be customer terminals, may be deemed as preferred or have some level of priority for inclusion in pre-qualification, e.g., the dynamic pre-qualification 500. In addition or alternatively, it may be that an enterprise service contract not only permits, but calls for VSATs of that enterprise, to be used on a non-interfering basis to opportunistically verify site (rather than system) health. In this case, these prioritized terminals 110 may have preference for being used as pre-qualified terminals. There may even be some scenarios where a customer may be incentivized to allow their terminals to be prioritized. The incentives may include a financial incentive, upgraded service, or other incentive. In this way, customers may opt-in to allow their terminals 110, which may be well-positioned within a beam or have upgraded capabilities, to also have monitoring priority to be used to perform system operation tests before other candidate terminals are to be considered.

In-beam location may also be another pre-qualification factor, if applicable. In some examples, there may be value to prioritize terminals 110 that are near the edge of a satellite user beam, near the center of the beam, or other location within the beam. If such in-beam prioritization exists, then those terminals 110 that fit a particular in-beam pre-qualification position may have preference to serve as candidate health monitor VSATs, and therefore this may be another factor to consider during performance of the semi-static pre-qualification technique 400.

It should be appreciated that these pre-qualification factors are illustrative examples, and that there may be other factors not listed that may also be provided as part of the semi-static pre-qualification 400 process. It should also be appreciated that any one of these pre-qualification factors or other factors may be used, individually or in any combination and in any sequence, to narrow down the list of candidate terminals 110 that may be used to help formulate the first group 110A of terminals for system health monitoring. In some examples, those terminals 110 that are selected and pre-qualified based on the semi-static pre-qualification technique 400 may be further narrowed by performing dynamic pre-qualification 500, as described herein.

The semi-static pre-qualification technique 400 may be performed automatically by system 100 and may be relatively infrequent since the pre-qualification factors may not typically change too often. Although the semi-static pre-qualification technique 400 may be performed iteratively at any time, it may be useful for the semi-static pre-qualification technique 400 to be performed anywhere in the range of minutes, days, weeks, or months. In some examples, the semi-static pre-qualification technique 400 may be performed every 1 or 2 days.

Figure 5:
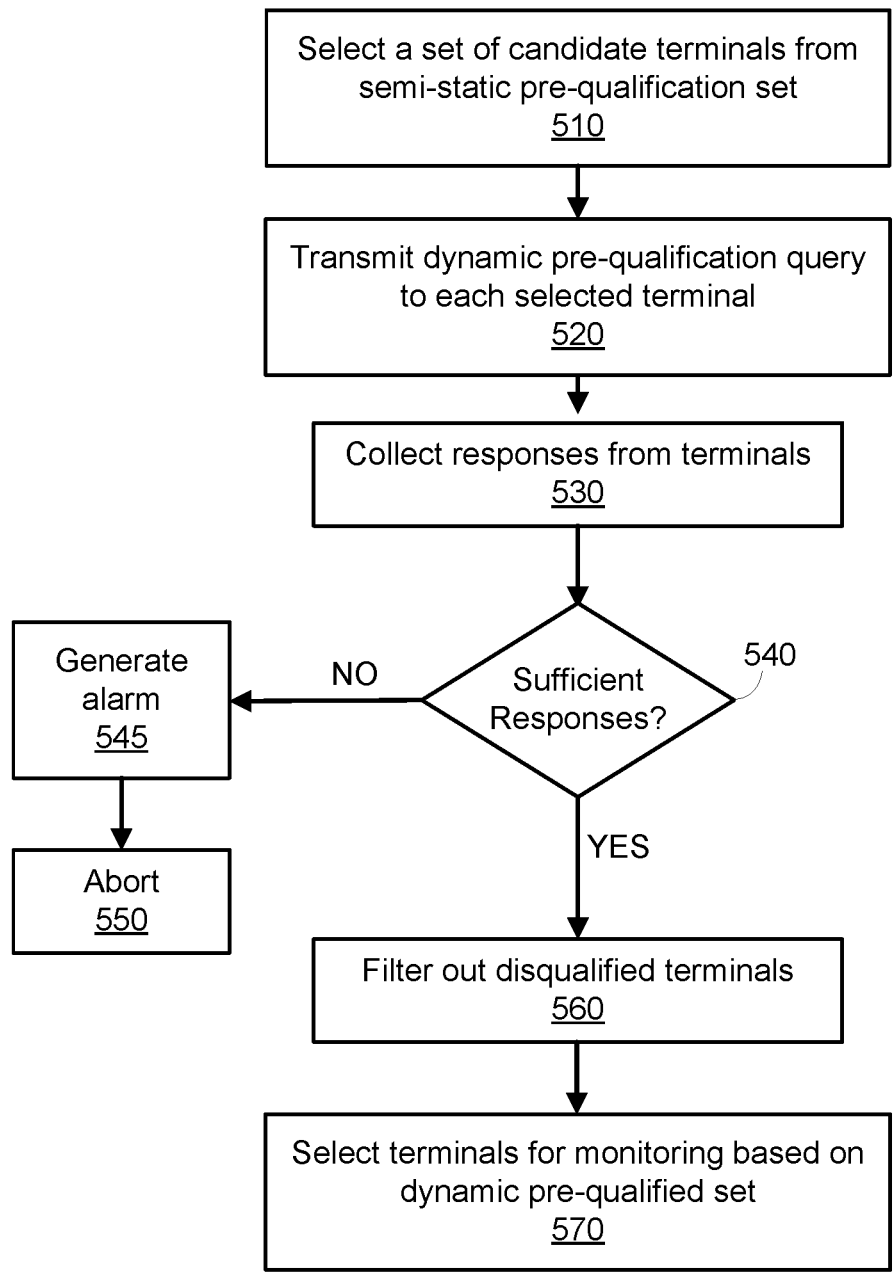
FIG. 5 illustrates a method for dynamic pre-qualification in a satellite system, according to an example.

In some examples, the dynamic pre-qualification technique 500 may be used to determine a subset of candidate terminals based on any given health monitoring test cycle. For example, the dynamic pre-qualification technique 500 may help narrow a subset of terminals 110 for pre-qualification based on current terminal status, etc. FIG. 5 illustrates a method 500 for dynamic pre-qualification in a satellite system, according to an example. As described above, the semi-static prequalification technique 400 may be used to help identify VSATs that are candidates to be used for health monitoring, but it might be the case that those terminals 110 may still not be entirely suitable for use in a given health test cycle.

For example, there are a number of reasons why terminals 110 that were "pre-qualified" by the semi-static pre-qualification technique 400 may not be suited to be include in the final subset of terminals to perform one or more system health tests. For instance, a terminal may be powered off or impaired by a weather condition. In another example, the terminal may be in use by the end customer, which means that executing health monitor tests might interfere with concurrent customer service. Also, the terminal might be in process of some transition that would make it inadvisable to use, or make it made more complicated by concurrent health monitor testing. For example, this terminal may be a mobile VSAT nearing a spot beam boundary and a handover trigger, a VSAT in the process of downloading new software to be executed, or a VSAT performing some other complex operation. As a result, even if semi-static prequalification may identify or select a subset of potential terminal candidates, dynamic pre-qualification 500 may still be needed. Such dynamic pre-qualification 500 may be based on a more immediate terminal status at a time closer to when actual testing will be needed. As a result, the dynamic pre-qualification technique 500 may be performed as needed, and anywhere within the range of seconds, minutes, days, and weeks.

In this scenario, the system 100 may further narrow qualified terminals for any given monitoring cycle by executing the dynamic pre-qualification technique 500, as described here. This technique 500, for example, may include the network management system (NMS) 150 selecting more candidate VSATs than are needed to conduct a given test, querying immediate status of those VSATs, discarding those with unsuitable status, and/or selecting at least a minimum number of test sites from among the remaining qualified sites. In some examples, the initial dynamic pre-qualification technique 500 and narrowing selection may be based on initially those candidate terminals selected or identified from the semi-static pre-qualification 400. Here, the dynamic pre-qualification selection 500 may be performed for each monitoring test cycle, or less often, for example once day, but the immediate status query action and pre-qualification may be performed for each test cycle. The technique 500 for dynamic pre-qualification may be as follows.

At 510, the network management system (NMS) 150 may select a number of candidate VSATs from the semi-static pre-qualified candidate list of terminals. This may be the entire set or subset of candidate VSATs from the semi-static pre-qualified candidate list, or may be an entirely different set of VSATs, to perform system operation tests. At 520, the network management system (NMS) 150 may transmit a dynamic pre-qualification status query to each of those candidate VSATs from the selected candidate terminals. Each of the queried VSATs, in response to the dynamic pre-qualification status query, may perform any number of status self-checks and may send one or more replies to be received and collected, at 530, by the network management system (NMS) 150.

In some examples, this set of status self-checks may be used to help determine whether the terminal is able to be used to perform system operation tests. For example, the status self-check may include any of the following: terminal state, user activity, transmission link quality, transmission link reliability, or any other status check. The VSAT state status check may help identify that a VSAT is in normal operating condition, is it in some contingency state (such as coming up or downloading software), or is it in some transition state (such as a mobile terminal about to transition to a new beam).

The user activity status check may be based on aggregate transmit/receive bytes over a configured preceding duration, such as the previous five (5) minutes. Other factors may include, for example, not performing tests if a customer voice over IP call is in progress, or other traffic-based consideration.

The transmission link quality status check may be based on, for example, a forward or return path adaptive coding and modulation (ACM) modulation constellation (Mod-Cod). It should be appreciated that a forward path may be from a gateway 130 to terminal 110, and a return path may be from a terminal 110 to gateway 130. Thus, a terminal 110 that has adapted to a very robust modulation constellation (ModCod) may be indicative of local rain or poor pointing, making that VSAT a poor candidate to run one or more system health tests.

The transmission link reliability status check may be based on the averaged packet or frame error rate over a recent period, such as the previous five (5) minutes. A high error rate, in some examples, may be indicative of either a site-specific problem or a system level problem, and due to this ambiguity, such terminals may be excluded.

The terminal (e.g., VSAT), network management system (NMS) 150, or both, or some other combination of system components may determine whether or not the terminal can support the test. For example, the VSAT may decline based on a variety of reasons. A terminal, for instance, may decline based on an operating state (e.g., a mobile terminal about to move to a new beam) or on some threshold such as user activity level, or the VSAT may return applicable statistics or status to the network management system (NMS) 150 to compare against thresholds, in which case the network management system (NMS) 150 might disqualify the VSAT.

Once these status check responses are received and collected from each of the queried terminals, the network management system (NMS) 150 may filter out those terminals that cannot support the desired system health tests, or from which no response was received, based on determining, at 540, sufficiency of the responses. In some examples, it should be appreciated that a predetermined threshold may be set so that in situations where the responses are insufficient, either in quality, quality, or other insufficiency (e.g., responses do not meet or exceeded a predetermined number or percentage of terminal responses, the network management system (NMS) 150 may generate, at 545, an alarm or notification for possible beam or system health problem(s). In this case, the network management system (NMS) 150 may decide to delay or abort 550 any further dynamic pre-qualification 500.

However, if the responses are determined to be sufficient (e.g., by meeting predetermined thresholds), the network management system (NMS) 150, at 560, may filter out the disqualified terminals, and at 570, the network management system (NMS) 150 may select from the resulting set(s) of pre-qualified terminals, a number of terminals to perform health tests for each target beam. It should be appreciated that these selected terminals may comprise a quantity from each candidate list partition or they may be randomized across the candidate set on a priority basis.

Each VSAT may execute a health monitor test suite on receipt of a command from the network management system (NMS) 150 to do so, and then report its test results to the network management system (NMS) 150. The test suite may be defined so as to be performed by the operational software release that is integral to the VSAT. This may be achieved, for example, without reliance on external test or customer devices.

Depending on the duration of the test, it may be the case that the customer becomes active using the VSAT during the test. In such case, or if the VSAT state otherwise changes such that it is no longer qualified to complete the test suite, the VSAT may abort the test and may return a test abort message to the network management system (NMS) 150. This message, for example, may include partial test results, if applicable, or test results may be reported through other methods, techniques, or channels.

It should be appreciated that the VSAT may perform any number of system operation tests from the health test suite without depleting any purchased user download or upload volume allowance. For example, this might be achieved by any of several methods. First, the test suite start and end may be signaled to a gateway 130 peer component (such as an IPGW 244) that manages the VSAT volume usage accounting, informing that peer component to either not count intervening traffic in usage accounting, or else to account for it as test traffic that is not considered in the customer volume allowance.

Second, the test may mark each test traffic message accordingly using for example a bit flag in an over-satellite adaptation header, such that the gateway 130 peer component does not count that traffic in usage accounting, or accounts for it as test traffic.

Third, the customer may also be given a one-time volume allowance bump beyond the contract volume allowance when the VSAT is selected for a given test. Here, the volume bump may correspond to the maximum traffic that is generated by the test. In this case, it may be important to identify this allowance bump and test traffic volume on any customer viewable usage meter or site to avoid future misunderstanding. Alternatively, the VSAT may be given a recurring volume allowance bump with each new volume accounting period, for example in return for opting in to permit the VSAT site to be used for system health monitoring, whether that VSAT is used to run tests or not. The recurring volume allowance bump, in some situations, may be sufficient to make up for the maximum possible aggregate test traffic contribution during the volume accounting period, and the actual test traffic volume may be included in the user usage accounting, and would also be separately counted and shown on some customer viewable usage meter or site to avoid future misunderstanding.

The VSAT health test suite may also be executed to not be accounted in an overall system or per-beam or per-channel capacity subscription of a virtual network operator. Similar mechanisms or techniques, as described herein, to identify test traffic may be employed such that the gateway 130 or network data center 140 may recognize and exclude such traffic from virtual network operator (VNO) accounting.

Although the dynamic pre-qualification technique 500 is described as being performed after the semi-static prequalification technique 400, it should be appreciated that the techniques 400 or 500 may be performed in any order, alone or in combination, depending on the system health monitoring needs of the system 100, and such pre-qualification may be predetermined by the system 100 automatically or by an administrator, such as a system operator.

Figure 6:
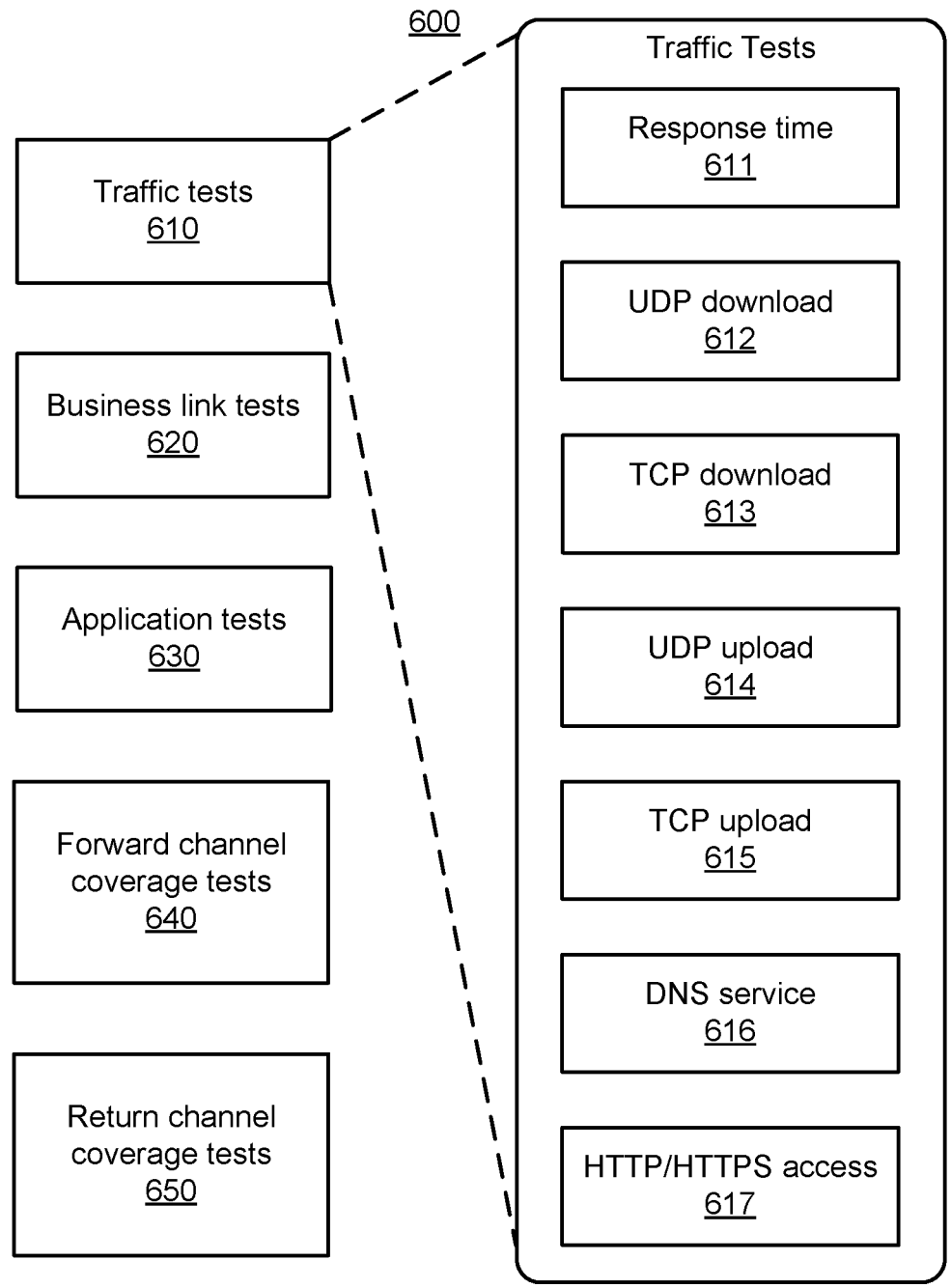
FIG. 6 illustrates a block diagram of various system operation tests in a satellite system, according to an example.

FIG. 6 illustrates a block diagram 600 of various system operation tests in a satellite system, according to an example. There may be any number of system operation tests that a terminal 110 from the pre-qualified first group 110A may perform as part of a system health check or health monitoring cycle. As shown, these system operation tests may include, but not limited to, the following groupings: traffic tests 610, business link tests 620, application tests 630, forward channel coverage tests 640, and/or return channel coverage tests 650. In any particular system health check, some or all of these tests, may be performed by the pre-qualified terminals 110 of the first group 110A in any order. These test types and considerations for their use are described in more detail below.

In some examples, the traffic tests 610 may include, but not limited to, response time 611, user datagram protocol (UDP) download 612, transmission control protocol (TCP) download 613, user datagram protocol (UDP) upload 614, transmission control protocol (TCP) upload 615, domain name system/service (DNS) 616, HTTP/HTTPS access 617, or other traffic test. It should be appreciated that for the response time test, the terminal may send one or more messages to a test host within the gateway 130, network data center 140, or the network management system (NMS) 150, and may receive responses, measuring, for example, the average round-trip response time. The test may pass if sufficient responses are received, or alternatively within a predetermined time threshold. It should be appreciated that the response time test may include an ICMP ping or other similar test.

For user datagram protocol (UDP) download 612, the terminal 110 may request a user datagram protocol (UDP) data transfer from a test host within the gateway 130, network data center 140, or the network management system (NMS) 150, verifying successful transfer and measuring a packet error rate (missed or corrupted packets) and throughput. The test may pass if the test file is received, or alternatively at below a predetermined packet error rate threshold. The test pass criteria may also include meeting at least a minimum download rate, possibly as scaled to the forward channel rate and current average loading. It should be appreciated that download (and upload) throughput criteria may not be used in event the terminal is being rate-throttled due to exceeding some volume allowance quota, or such status may be used to disqualify a terminal from being selected in the dynamic pre-qualification process.

It should also be appreciated that it may be important to avoid affecting other customer traffic if the forward channel is congested. In this case, there may be two actions that may be taken. In one action, the terminal may scale the size of the data transfer requested based on forward channel loading, for example with threshold values for average percent channel utilization over a period such as the preceding 10 seconds. In this manner, the terminal may not contribute a big download to forward channel loading if capacity is congested. As another action, the terminal may delay start of this test (or all health check tests) within some randomization time window, such that multiple terminals selected to perform health tests in a beam at a given test cycle may not simultaneously contribute load. In some examples, an "iperf" tool built into operating systems, such as Linux®, Windows®, etc., may be suitable to perform a UDP (or TCP) download (or upload) test. It should be appreciated that it might be helpful to perform this and other tests using IPv4 and IPv6, especially if the network supports both IP versions.

For transmission control protocol (TCP) download 613, the terminal 110 may request a transmission control protocol (TCP) data transfer from a test host within the gateway 130, network data center 140, or the network management system (NMS) 150, verifying successful transfer and measuring a packet transmission control protocol (TCP) retransmit rate and throughput. The test may pass if the test file is received, or alternatively at below a transmission control protocol (TCP) packet retransmission rate threshold. The test pass criteria may also include meeting at least a minimum download rate. Similar actions may also be taken to avoid introducing network congestion as are described above for user datagram protocol (UDP) download. It should be appreciated that transmission control protocol (TCP) download and upload may be tested in addition to user datagram protocol (UDP) in event the satellite network implements a transmission control protocol (TCP) performance enhancing proxy (PEP), which may be implemented for geosynchronous satellite systems.

For user datagram protocol (UDP) upload 614, the terminal 110 may initiate and perform a user datagram protocol (UDP) data transfer to a test host within the gateway 130, network data center 140, or the network management system (NMS) 150, verifying successful transfer and measuring a packet error rate (missed or corrupted packets) and throughput. The test may pass if the test file is delivered, optionally at below a packet error rate threshold. The test pass criteria may also include meeting at least a minimum upload rate. As with downloads, it may important to avoid affecting other customer traffic if return channel capacity is congested, and the terminal may scale the upload file size according to gateway-advertised return channel loading.

For transmission control protocol (TCP) upload 615, the terminal 110 may initiate and perform a transmission control protocol (TCP) data transfer to a test host within the gateway 130, network data center 140, or the network management system (NMS) 150, verifying successful transfer and measuring a packet transmission control protocol (TCP) retransmit rate and throughput. The test may pass if the test file is delivered, or alternatively at below transmission control protocol (TCP) packet retransmission rate threshold. The test pass criteria may also include meeting at least a minimum upload rate. Similar actions may be taken to avoid aggravating network congestion as are described above for user datagram protocol (UDP) upload 614.

In traffic tests 610 that involve DNS service 616, the terminal 110 may confirm availability of the DNS resolution service by sending to its DNS server, in the gateway 130 or network data center 140, a DNS resolution request for a (well-known) domain name, and may confirm a corresponding name resolution is received within some time threshold. It should be appreciated that the terminal 110, in some examples, may require to first flush any entry it has for that domain name from a local DNS cache within the VSAT.

For hypertext transfer protocol (HTTP) and hypertext transfer protocol secure (HTTPS) access 617, the terminal 110 may confirm availability of web browsing service by sending a web page request to a test host within the gateway 130, network data center 140, or the network management system (NMS) 150, and verifying successful download of the test web page. The test may pass if the complete web page is received, or alternatively in under a target response time threshold value. In the event the system 100 implements hypertext transfer protocol (HTTP) pre-fetch acceleration, separate tests may be performed for a hypertext transfer protocol (HTTP) accessible page and a hypertext transfer protocol secure (HTTPS) accessible page.

In some examples, business link tests 620 may be performed. The system 100, for example, may include certain customer accessible web hosts to enable customers to monitor their usage, to pay bills, to respond to surveys or conduct self-help, or for other functions considered important to system operation and health. In these cases, the health monitoring test suite executed by the VSAT may include tests to verify availability to connect to these hosts and access content. For instance, the VSAT may be configured with a set of URLs for business link tests 620, with indication to use hypertext transfer protocol (HTTP) or hypertext transfer protocol secure (HTTPS) for access. In addition or alternatively, the VSAT may access each URL using HTTP or hypertext transfer protocol secure (HTTPS) as configured, with the test passing if each page is successfully downloaded. It should be appreciated that this may be a generic page access. In other words, the VSAT may not be configured with customer-owned account/password information, as this may be a test of business system availability over the satellite network, rather than a test of individual customer data access.

Targeted application tests 630 may also be performed. In some examples, customers may purchase service to download content from and upload content to desired Internet and Intranet hosts, and the VSAT health monitoring test suite may include confirming ability to access certain high-value Internet or Intranet URLs, for example, Google®, Facebook®, Netflix®, YouTube®, and the like. A listing of high value URLs to be checked may be configured in the terminal 110. Here, the terminal may access each of these URLs in turn, using hypertext transfer protocol (HTTP) or hypertext transfer protocol secure (HTTPS) as configured, with the test passing if each web page is successfully downloaded.

In the even these tests are performed, it should be noted that there may be several important considerations to be taken into account. First, the test, in some examples, may access a top-level page only, and may not log onto a host site using a customer-owned account/password, nor a network-owned account/password. In the latter case, for example, downloading a Netflix® or YouTube® video from many sites each using a network-owned VSAT-specific account may introduce nuisance loading into those business operations, and if done using a common network-owned account, such businesses may likely detect many different sites accessing the same account and take protective action that could affect the end customer. Second, the access to such hosts may likely be from an IP address recognizable as a network test address, not attributable to an end-customer, in event of monitoring by law enforcement authorities. Third, access to such hosts may likely be from an IP address that would not allow attacks from external networks (such as the Internet) to reach a VSAT management/test agent, but which would allow the target URL host to respond to the web page request being tested.

Forward channel coverage tests 640 and return channel coverage tests 650 may also be performed. The terminals 110 may be provisioned with multiple forward communication channels within a given beam, and it may be beneficial to test the health of each such channel. Each channel, for example, may utilize different sets of equipment in the gateway 130, any set which may have a silent failure. Additionally, each channel may also be independently interfered with by some outside noise source. Thus, there may be a few possibilities to achieve forward channel coverage that are described below. First, for systems in which the VSAT is agile to move between forward channels and gain service (e.g., the VSAT is compatible with each channel type), the VSAT service plan may be available using each forward channel, and there may otherwise be no restrictions (such as virtual network operator (VNO) capacity contracts) that would prevent a given VSAT from being used to test multiple forward channels. In this case, the VSAT may cycle between the available forward channels, conducting at least one user datagram protocol (UDP) or transmission control protocol (TCP) download test on each such channel, before returning to its starting channel or else selecting a new ending channel for ongoing service. This movement, in some examples, may be determined by the VSAT, and/or in cooperation with some gateway forward channel load balancing entity.

Second, for systems in which either the VSAT is not agile, is not compatible to test all forward channels types, cannot gain service via a given channel, or is limited due other restrictions (such as VNO capacity contracts), the network management system (NMS) 150 may instead pre-qualify a different set of VSATs to conduct tests in each such grouping for a given health monitoring cycle.

It should be appreciated that for systems that employ adaptive coding and modulation (ACM) on forward channels, such as by using the DVB-S2 standard, the VSAT test may optionally cycle through a set of ACM modulation constellation (ModCod) values, verifying operation or an error rate below threshold for each test modulation constellation (ModCod). Other various alternatives may also be provided.

For return channel coverage tests 650, the terminals 110 may be provisioned with multiple return channels in a beam, and it may be beneficial to verify the operation of each such channel. In some examples, two types of channel must be considered: (1) contention channels, and (2) allocated channels.

For (1) contention channels, a listing of available contention channels may be advertised by a gateway 130 and a channel for use selected by the VSAT. As a result, a VSAT conducting health tests may cycle through the set of advertised contention channels, testing each in turn. A test, in this case, may comprise sending a message on each given channel that will elicit some response, and confirming the response is received. Given the contention nature of such channel access, there may be some probability that a request will be lost due to a channel access collision with another VSAT. Consequently, testing contention channels may entail making some number of requests on a given channel and verifying that some threshold percentage of requests result in successful responses.

For (2) allocated channels, higher bandwidth channels may be allocated by some entity in the gateway 130 or network data center 140, in response to a terminal request on a contention channel (or on some other allocated channel). In this operation, cooperation with the return bandwidth allocation unit 242 may be required for a VSAT to receive allocations enabling it to cycle through the available return channels for a given system health test cycle. In some examples, this may be achieved in different ways, depending on the capabilities of the system under test. First, the gateway bandwidth allocation entity, having been informed a VSAT is performing a return channel coverage test, may build a list of channels for the terminal to test, and provide allocation to each in turn when requested. Second, the terminal 110 may build a list of channels to test, and send a special return channel test allocation request to the Gateway to get allocation for each channel in turn. Thus, for systems that employ adaptive coding and/or modulation (ACM) on return channels, the VSAT test may optionally cycle through a set of ACM modulation constellation (ModCod) values, verifying operation or an error rate below threshold for each test modulation constellation (ModCod). Other various options may also be provided.

Referring back to method 300 of FIG. 3, the system 100 or system component 200 may report 330 system operation test results. In some examples, a terminal 110 may send health check test results in a message to the network management system (NMS) 150 upon completing a directed test sequence. The system operation test results may include an overall pass-fail result, pass-fail result for each individual system operation test with specific measure values, specific measured values for which pass-fail is determined based on comparing to predetermined thresholds, a time of the performed system operation test, and/or any other result. What is collected and/or outputted may also be configurable or customized by the system 100 automatically or by a system operator.

The network management system (NMS) 150 may log pass/fail results as well as measured values into a performance database to provide short-term reporting as well as long term performance trending capability. For example, the network management system (NMS) 150 may provide the results for display to the operator of the latest response time or download throughput metrics for each beam, highlighting those that do not meet target threshold criteria. Additionally, the network management system (NMS) 150 may provide various graphical trend displays of measured results over time, for example, throughput over time of day (which might be expected to show differences in busy periods due to congestion) or average throughput within a designated time window for a given beam over an extended period. Again, the results and displays of the results may be customizable or configured by the system 100 or system operator.

In the even the system operation test results indicate a potential system operation or health issues, the system 100 may generate, at 340, an alarm or notification based on the determination of potential system operation issues. For instance, the network management system (NMS) 150 may generate any number of alarms or notifications for the system 100, based on results across multiple similarly-situated VSATs within a beam. Particularly, the network management system (NMS) 150 may decide not to generate an alarm if one out of five VSATs conducting a test cycle in a beam reports failure of a given test. However, the network management system (NMS) 150 may generate an alarm if more than two of five VSATs report failure of the same test. Different alarm severity levels may be applied depending on the percentage of failing VSATs. In other words, a predetermined threshold may be provided based on percentages, type of potential system health problem, terminal reliability, etc.

It should be appreciated that results from terminals that abort test cycles due to user activity or other state changes may also not be considered, other than for those tests completed. As described above, the network management system (NMS) 150 may also generate an alarm if unable to get dynamic pre-qualification responses from a certain number of candidate terminals for a given beam, or if it does not receive a test result report from some percentage of terminals initiated for test.

FIG. 7 illustrates a block diagram of a computer system for monitoring operational status and detecting faults, according to an example. The computer system 700 may be part of or any one of the terminals 110, the gateway 130, the network data center 140, the network management system (NMS) 150, the business system 160, as shown in system 100 and/or 200 to perform the functions and features described herein. The computer system 700 may include, among other things, an interconnect 710, a processor 712, a multimedia adapter 714, a network interface 716, a system memory 718, and a storage adapter 720.

The interconnect 710 may interconnect various subsystems, elements, and/or components of the computer system 700. As shown, the interconnect 710 may be an abstraction that may represent any one or more separate physical buses, point-to-point connections, or both, connected by appropriate bridges, adapters, or controllers. In some examples, the interconnect 710 may include a system bus, a peripheral component interconnect (PCI) bus or PCI-Express bus, a HyperTransport or industry standard architecture (ISA)) bus, a small computer system interface (SCSI) bus, a universal serial bus (USB), IIC (I2C) bus, or an Institute of Electrical and Electronics Engineers (IEEE) standard 1394 bus, or "firewire," or other similar interconnection element.

In some examples, the interconnect 710 may allow data communication between the processor 712 and system memory 718, which may include read-only memory (ROM) or flash memory (neither shown), and random access memory (RAM) (not shown). It should be appreciated that the RAM may be the main memory into which an operating system and various application programs may be loaded. The ROM or flash memory may contain, among other code, the Basic Input-Output system (BIOS) which controls basic hardware operation such as the interaction with one or more peripheral components.

The processor 712 may be the central processing unit (CPU) of the computing device and may control overall operation of the computing device. In some examples, the processor 712 may accomplish this by executing software or firmware stored in system memory 718 or other data via the storage adapter 720. The processor 712 may be, or may include, one or more programmable general-purpose or special-purpose microprocessors, digital signal processors (DSPs), programmable controllers, application specific integrated circuits (ASICs), programmable logic device (PLDs), trust platform modules (TPMs), field-programmable gate arrays (FPGAs), other processing circuits, or a combination of these and other devices.

The multimedia adapter 714 may connect to various multimedia elements or peripherals. These may include a devices associated with visual (e.g., video card or display), audio (e.g., sound card or speakers), and/or various input/output interfaces (e.g., mouse, keyboard, touchscreen).

The network interface 716 may provide the computing device with an ability to communicate with a variety of remove devices over a network (e.g., private network 170 or public network 180 of FIG. 1) and may include, for example, an Ethernet adapter, a Fibre Channel adapter, and/or other wired- or wireless-enabled adapter. The network interface 716 may provide a direct or indirect connection from one network element to another, and facilitate communication and between various network elements.

The storage adapter 720 may connect to a standard computer-readable medium for storage and/or retrieval of information, such as a fixed disk drive (internal or external).

Many other devices, components, elements, or subsystems (not shown) may be connected in a similar manner to the interconnect 710 or via a network (e.g., private network 170 or public network 180 of FIG. 1). Conversely, all of the devices shown in FIG. 7 need not be present to practice the present disclosure. The devices and subsystems can be interconnected in different ways from that shown in FIG. 7. Code or computer-readable instructions to implement the dynamic approaches for payment gateway selection and payment transaction processing of the present disclosure may be stored in computer-readable storage media such as one or more of system memory 718 or other storage. Code or computer-readable instructions to implement the dynamic approaches for payment gateway selection and payment transaction processing of the present disclosure may also be received via one or more interfaces and stored in memory. The operating system provided on computer system 700 may be MS-DOS®, MS-WINDOWS®, OS/2®, OS X®, IOS®, ANDROID®, UNIX®, Linux®, or another operating system.

It should be appreciated that some consideration may be given to monitoring system health for satellites in mid-earth orbit (MEO) or low-earth orbit (LEO). There may be two specific types of MEO/LEO system to be considered. The first may be one in which beams are of fixed location on the earth's surface, and the second may be one in which beams move across the earth's surface as the satellites move.

In the first type, the satellite antenna may be continually adjusted to maintain the same beam positioning on the ground, and the beam may be handed over from a descending satellite to a rising satellite in some synchronized manner. In this case, the terminal 110 or VSAT may include a tracking antenna, and may use knowledge of satellite ephemeris data, for example, to (i) keep its VSAT antenna pointed to the satellite in service for the beam, and/or (ii) repoint its VSAT antenna when the next satellite takes over service for the beam. In this type of system, the design and solutions described above may still be implemented. The health report may include a time range of the test and the satellite in use during the test. It should be appreciated that the threshold for pre-qualification of a terminal based on link quality may have to consider that weather may be directional. For example, a terminal might quickly transition from a good to bad link due to position of the satellite and rain clouds relative to the terminal, and pre-qualification may be performed and then testing later aborted due to link degradation.

In the second type, the satellite antenna may project a fixed downlink/uplink beam pattern, which moves across the surface of the earth as the satellite moves in its orbital path. The terminal 110 or VSAT may use its tracking antenna as above to follow the satellite in use, and to transition to the next satellite which may be taking over coverage of the VSAT location. In this case, there may be no notion to select VSATs near beam center or beam-edge, as the beam center and edge may continue to move. Thus, a terminal 110 may not be disqualified from use for test when the beam edge (and a consequent beam handover) comes near.

In either case, if a health test fails possibly related to satellite link quality, the failure may be due to the satellite 120 in use, the gateway 130 serving that satellite 120 at that time, impairments (weather, interference) tied to the VSAT antenna look-angle, or the added reported information might be used for subsequent problem diagnosis. In case there is a satellite handover during the test, the test results may be grouped according to which satellite was used for each test.

As mentioned above, what is shown and described with respect to the systems and methods above are illustrative. While examples described herein are directed to configurations as shown, it should be appreciated that any of the components described or mentioned herein may be altered, changed, replaced, or modified, in size, shape, and numbers, or material, depending on application or use case, and adjusted for monitoring system health and/or detecting faults.

It should be appreciated that the systems and methods described herein may facilitate more reliable use of terminals to monitor system health and/or detect system faults. It should also be appreciated that the systems and methods, as described herein, may also include or communicate with other components not shown. For example, these may include external processors, counters, analyzers, computing devices, and other measuring devices or systems. This may also include middleware (not shown) as well. The middleware may include software hosted by one or more servers or devices. Furthermore, it should be appreciated that some of the middleware or servers may or may not be needed to achieve functionality. Other types of servers, middleware, systems, platforms, and applications not shown may also be provided at the back-end to facilitate the features and functionalities of the testing and measurement system.

Moreover, single components may be provided as multiple components, and vice versa, to perform the functions and features described herein. It should be appreciated that the components of the system described herein may operate in partial or full capacity, or it may be removed entirely. It should also be appreciated that analytics and processing techniques described herein with respect to the optical measurements, for example, may also be performed partially or in full by other various components of the overall system.

It should be appreciated that data stores may also be provided to the apparatuses, systems, and methods described herein, and may include volatile and/or nonvolatile data storage that may store data and software or firmware including machine-readable instructions. The software or firmware may include subroutines or applications that perform the functions of the measurement system and/or run one or more application that utilize data from the measurement or other communicatively coupled system.

The various components, circuits, elements, components, and interfaces, may be any number of mechanical, electrical, hardware, network, or software components, circuits, elements, and interfaces that serves to facilitate communication, exchange, and analysis data between any number of or combination of equipment, protocol layers, or applications. For example, the components described herein may each include a network or communication interface to communicate with other servers, devices, components or network elements via a network or other communication protocol.

Although examples are directed to satellite communication systems, such as high throughput satellite (HTS) systems, it should be appreciated that the systems and methods described herein may also be used in other various systems and other implementations. For example, these may include other various telecommunication test and measurement systems. In fact, there may be numerous applications in cable or optical communication networks, not to mention fiber sensor systems that could employ the systems and methods as well.

It should be appreciated that the systems and methods described herein may also be used to help provide, directly or indirectly, measurements for distance, angle, rotation, speed, position, wavelength, transmissivity, and/or other related tests and measurements.

By leveraging existing customer terminals, the system and methods described herein may provide efficient processing techniques and a cost-effective approach that may be readily integrated into various and existing network equipment. The systems and methods described herein may provide mechanical simplicity and adaptability to small or large satellite communication systems. Ultimately, the systems and methods described herein may increase efficiency, reduce cost, maximize existing equipment, minimize adverse effects of traditional systems, and improve monitoring capabilities for system health and detecting faults.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. A system, comprising:
   a processor;
   a memory storing instructions, which when executed by the processor, cause the processor to:
   select, from a plurality of terminals, a subset of terminals to perform system operation tests using a dynamic pre-qualification technique, wherein the dynamic pre-qualification technique comprises selecting the subset of terminals to perform system operation tests based on sufficiency of received query responses from a potential subset of terminals to perform system operation tests;
   perform system operation tests using the selected subset of terminals; and
   report results from the system operation test using the selected subset of terminals.

2. The system of claim 1, wherein the dynamic pre-qualification technique further comprises:
   selecting the potential subset of terminals to perform system operation tests;
   transmitting a dynamic pre-qualification query to each terminal from the selected potential subset of terminals;
   receiving at least one query response from each of the selected potential subset of terminals;
   determining the sufficiency of each of the received at least one query responses; and
   selecting the subset of terminals to perform system operation tests based on the sufficiency of the received query responses.

3. The system of claim 2, wherein the query response is based on at least one status self-check performed by each of the terminals, wherein the status self-check is used to help determine whether the terminal is able to be used to perform system operation tests, the status self-check comprising at least one of terminal state, user activity, transmission link quality, and transmission link reliability.

4. The system of claim 2, wherein the sufficiency of each of the received at least one query responses is based on the at least one of the status self-check meeting a predetermined threshold or responsiveness of the terminal to the dynamic pre-qualification query.

5. The system of claim 2, wherein the memory storing instructions further comprises:
performing, in response to the determination that at least one query responses is insufficient, at least one of the following actions:
generate an alarm or notification;
delay the dynamic pre-qualification technique; and
abort the dynamic pre-qualification technique.

6. The system of claim 2, wherein selecting the subset of terminals to perform system operation tests comprises:
disqualifying terminals associated with insufficient query responses;
filtering out disqualified terminals from the subset of terminals to perform system operation tests; and
adding qualified terminals into the subset of terminals to perform system operation tests.

7. The system of claim 6, wherein selecting the subset of terminals to perform system operation tests further comprises:
prioritizing the qualified terminals within the subset of terminals to perform system operation tests.

8. The system of claim 1, wherein system operation tests comprises at least one of: traffic tests, business link tests, application tests, forward channel coverage tests, and return channel coverage tests.

9. The system of claim 1, wherein the results of the system operation tests are reported with at least one of the following: an overall pass-fail result, a pass-fail result for each individual system operation test with specific measure values, specific measured values for which pass-fail is determined based on comparing to predetermined thresholds, and a time of the performed system operation test.

10. The system of claim 1, wherein the memory storing instructions further comprises:
determining potential system operation issues based on the results of the system operation tests using the selected subset of terminals; and
generating at least one alarm or notification based on the determination of potential system operation issues.

11. A method for monitoring operational status and detecting faults in a satellite system, comprising:
selecting, by a processor, a subset of terminals, from a plurality of terminals, to perform system operation tests, wherein selecting the subset of terminals uses a dynamic pre-qualification technique, wherein the dynamic pre-qualification technique comprises selecting the subset of terminals to perform system operation tests based on sufficiency of received query responses from a potential subset of terminals to perform system operation tests;
performing system operation tests using the selected subset of terminals; and
reporting results from the system operation test using the selected subset of terminals.

12. The method of claim 11, wherein the dynamic pre-qualification technique comprises selecting the subset of terminals to perform system operation tests by:
identifying the potential subset of terminals to perform system operation tests;
transmitting a dynamic pre-qualification query to each terminal from the identified potential subset of terminals;
receiving at least one query response from each of the identified potential subset of terminals;
determining the sufficiency of each of the received at least one query responses; and
selecting the subset of terminals to perform system operation tests based on the sufficiency of the received query responses.

13. The method of claim 12, wherein the query response is based on at least one status self-check performed by each of the terminals, wherein the status self-check is used to help determine whether the terminal is able to be used to perform system operation tests, the status self-check comprising at least one of: terminal state, user activity, transmission link quality, and transmission link reliability.

14. The method of claim 12, wherein the sufficiency of each of the received at least one query responses is based on the at least one of the status self-check meeting a predetermined threshold and responsiveness of the terminal to the dynamic pre-qualification query.

15. The method of claim 12, further comprising:
performing, in response to the determination that at least one query responses is insufficient, at least one of the following actions:
generate an alarm or notification;
delay the dynamic pre-qualification technique; and
abort the dynamic pre-qualification technique;
determining potential system operation issues based on the results of the system operation tests using the selected subset of terminals; and
generating at least one alarm or notification based on the determination of potential system operation issues.

16. A non-transitory computer-readable storage medium having an executable stored thereon, which when executed instructs a processor to perform a method as follows:
selecting, from a plurality of terminals, a subset of terminals to perform system operation tests, wherein selecting the subset of terminals uses a dynamic pre-qualification technique, wherein the dynamic pre-qualification technique comprises selecting the subset of terminals to perform system operation tests based on sufficiency of received query responses from a potential subset of terminals to perform system operation tests;
performing system operation tests using the selected subset of terminals; and
reporting results from the system operation test using the selected subset of terminals.

17. The non-transitory computer-readable storage medium of claim 16, wherein:
the dynamic pre-qualification technique comprises selecting the subset of terminals to perform system operation tests by:
identifying the potential subset of terminals to perform system operation tests;
transmitting a dynamic pre-qualification query to each terminal from the identified potential subset of terminals;
receiving at least one query response from each of the identified potential subset of terminals;
determining the sufficiency of each of the received at least one query responses; and selecting the subset of terminals to perform system operation tests based on the sufficiency of the received query responses.

\* \* \* \* \*